United States Patent [19]
Boerger et al.

[11] 3,899,897
[45] Aug. 19, 1975

[54] BY-PASS SUCTION THROTTLING VALVE IN A REFRIGERATION SYSTEM

[75] Inventors: David H. Boerger, Inkster; Allen D. Krugler, Jr., Plymouth; Donald A. Willoughby, Northville, all of Mich.

[73] Assignee: Ford Motor Company, Dearborn, Mich.

[22] Filed: Apr. 3, 1974

[21] Appl. No.: 457,535

[52] U.S. Cl. .................. 62/196; 62/214; 62/217
[51] Int. Cl. .................................... F25b 41/00
[58] Field of Search .............. 62/217, 222–225, 62/196, 214

[56] References Cited
UNITED STATES PATENTS

| | | | |
|---|---|---|---|
| 3,365,905 | 1/1968 | Barbier | 62/217 |
| 3,810,366 | 5/1974 | Orth | 62/225 |

*Primary Examiner*—William E. Wayner
*Attorney, Agent, or Firm*—Donald J. Harrington; Keith L. Zerschling

[57] ABSTRACT

An air conditioning system adapted especially for use in automotive vehicles comprising a refrigerant compressor, a condenser and an evaporator situated in a closed air conditioning cycle wherein a thermal expansion valve is located in the refrigerant flow line connecting the condenser with the evaporator for throttling refrigerant flow from a high pressure at the condenser outlet to a lower pressure at the evaporator inlet and wherein a suction throttling valve is located between the evaporator outlet and the compressor inlet for controlling the evaporator outlet pressure under low evaporator load conditions, the thermal expansion valve responding to the pressure differential across the suction throttling valve, and means for modifying the pressure difference between the evaporator outlet and the compressor inlet under low load conditions thereby reducing the compressor power consumption for low load operating conditions while obtaining satisfactory compressor lubrication, reduced compressor noise and increased compressor durability.

6 Claims, 15 Drawing Figures

FIG. 10. High Evaporator Load

FIG. 11. Moderate Evaporator Load

Low Evaporator Load

FIG. 12.

Very Low Evaporator Load With Split Equalizer TXV-STV System

FIG. 13.

$Q_E = \dot{m}(H_4 - H_3)$

Very Low Evaporator Load With Conventional STV

FIG. 14.

$Q_E = \dot{m}(H_4 - H_3)$

BY-PASS SUCTION THROTTLING VALVE IN A REFRIGERATION SYSTEM

GENERAL DESCRIPTION OF THE INVENTION

Automotive air conditioning systems presently in use usually include an externally equalized thermostatic expansion valve for controlling evaporator outlet superheat under heavy load conditions. That is, the evaporator outlet or suction throttling device pressure is used as one of the operating parameters for establishing a controlled pressure drop in the refrigerant flow line connecting the condensor outlet and the evaporator inlet. A second operating parameter is evaporator exit temperature.

The condenser and the evaporator are located in series relationship in a closed air conditioning cycle with a compressor that is driven by the vehicle engine. If the air conditioning system is operated with a thermal expansion valve of this kind without the presence of a so-called suction throttling device between the compressor and the evaporator, it is possible that the thermal expansion valve will close or throttle excessively the refrigerant flow to the evaporator. The compressor inlet pressure then will fall to a very low value; and compressor noise, lubrication problems and cooling problems will result. To overcome this condition, it is common practice to use a suction throttling valve which supplies a low-pressure equalizing signal from the outlet side of the suction throttling device located at the outlet side of the evaporator to open the expansion valve. The suction throttling valve is designed in such instances to provide a relatively high pressure drop thereacross when the pressure on the outlet side of the evaporator is relatively low and to provide a relatively slight pressure drop thereacross when the pressure on the outlet side of the evaporator is higher. This signal pressure is used as an input signal for the expansion device.

During minimum load operation, especially at high speeds, it is possible for the differential pressure across the suction throttling device to cause the expansion device to open to a setting where the liquid refrigerant will be caused to flood the evaporator, and this results in formation of liquid slugs that may be conveyed to the inlet side of the compressor. That might damage the compressor and cause excessive noise. Furthermore, since the refrigerant flow rate under these conditions remains high, the compressor power consumption is high, which in turn reduces undesirably the fuel economy for the internal combustion engine.

We have overcome these difficulties normally associated with conventional air conditioning systems during operation at relatively low load. Our improved system includes a bypass equalizing passage that is formed with suitable orifices to provide a controlled flow around a suction throttling device. The effective pressure in the bypass passage structure is controlled by suitably calibrating the orifices, and that pressure is used as a signal that is distributed to a thermal expansion device. The bypass flow is very small compared to the total refrigerant flow and it does not affect the operation of the suction throttling device.

When our improved system operates with a high evaporator load condition, the thermal expansion device responds to the signal obtained from the suction throttling device to accommodate the increased refrigerant flow. When the load decreases to a relatively moderate evaporator value, the function of the expansion device is partly overruled because of the increasing pressure differential signal distributed to it from the suction throttling device. The suction throttling device under these conditions causes a shift in the enthalpy diagram for the air conditioning cycle toward a zone that is characterized by a maximum amount of refrigerant vapor as distinct from refrigerant liquid. The point in the enthalpy diagram that corresponds to the inlet side of the compressor is in a so-called two-phase or vapor-liquid zone in the enthalpy diagram, but is is located in that zone at a point that corresponds to a higher percentage of vapor for any given operating condition. Under low load operation the mass low therefore is smaller for any given heat input to the evaporator.

BRIEF DESCRIPTION OF THE FIGURES OF THE DRAWINGS

FIG. 5 shows in schematic form the mode of cooperation between the thermal expansion valve and the suction throttling valve in a known air conditioning system.

PARTICULAR DESCRIPTION OF THE INVENTION

Figure 1:
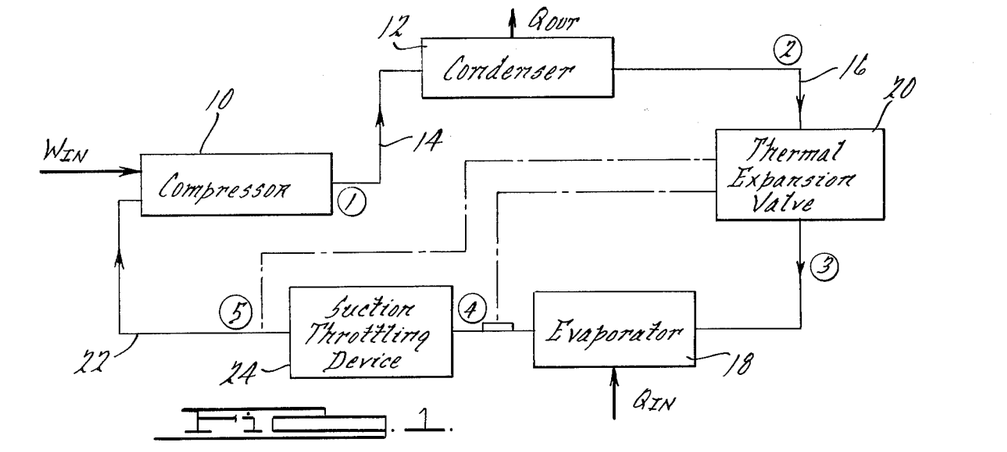
FIG. 1 shows in schematic form the principal elements of a conventional automotive vehicle air conditioning system.

In FIG. 1 numeral 10 designates a compressor in an air conditioning system which is schematically represented. The compressor is adapted to be belt driven by the vehicle engine with which the air conditioning system is used. The work added to the compressor by the belt drive is represented by the work vector $W_{in}$.

The compressor is connected in a refrigerant circuit to a condenser 12. The fluid passage between the outlet side of the compressor and the inlet side of the condenser is shown at 14.

The outlet side of the condenser is connected through a fluid passage 16 to the inlet side of an evaporator 18. Located in the passage 16 is a thermal expansion valve 20. This valve includes a flow controlling orifice which establishes a pressure drop in the fluid flow path through passage 16 so that the operating pressure for the evaporator is substantially less than the operating pressure for the condenser thereby permitting a change of phase for the refrigerant in the evaporator. This causes a heat flow from the ambient air into the evaporator, which is indicated schematically by the vector $Q_{in}$ in FIG. 1.

The outlet side of the evaporator 18 is connected to the inlet side of the compressor 10 through a refrigerant fluid passage 22. Located in the passage 22 is a suction throttling device 24. The suction throttling device, as explained previously, is used to maintain evaporator pressure at a given point during low and moderate loads to prevent evaporator freeze-up. A pressure equalizing signal based upon the compressor inlet pressure, or suction throttling valve outlet pressure, controls the degree of restriction in the refrigerant flow imposed by the thermal expansion valve, especially at low evaporator loads.

Figure 3:
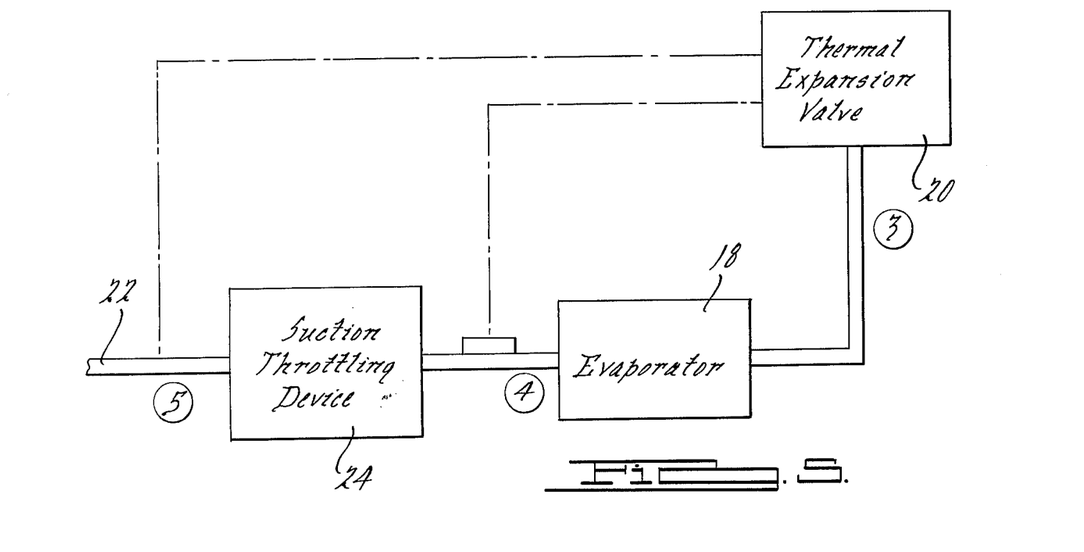
FIG. 3 shows a form of a thermal expansion valve capable of being used in the system of FIG. 1.

In FIG. 3 the thermal expansion valve 20' includes a housing 26 having a flow inlet fitting 28 and a flow outlet fitting 30. An internal refrigerant flow passage 32 connects the inlet fitting 28 with the outlet fitting 30. A flow restricting valve seat 36 in the passage 32 registers with a ball valve element 34. The valve seat for the ball valve element 34 is adapted to be seated by a valve spring 38 situated in the body 26. The valve seat 36 is connected by means of valve stems 40 and 42 to a flexible diaphragm 44 situated in a diaphragm housing 46. Diaphragm 44 cooperates with the housing 46 to define a pressure chamber 48 on the lower side of the diaphragm and a pressure chamber 50 on the upper side of the diaphragm. Chamber 48 communicates with signal passage 52, which is connected to passage 22 on the outlet side of the suction throttling device 24 shown in FIG. 1.

A temperature-to-pressure transducer distributes a pressure signal from the outlet side of the evaporator 18 of FIG. 1 to the chamber 50 through a signal passage 54. Valve element 34 provides a flow restriction to the passage of fluid from the outlet side of the condenser to the inlet side of the evaporator. Upon an increase in the pressure in the chamber 48 relative to the pressure in the chamber 50, the effective force tending to close the valve 34 increases thereby increasing the degree of restriction provided by the thermal expansion valve. Conversely, a decrease in the pressure in chamber 48 relative to the pressure in chamber 50 will result in an opening of the fluid flow path between the condenser and the evaporator.

Figure 4:
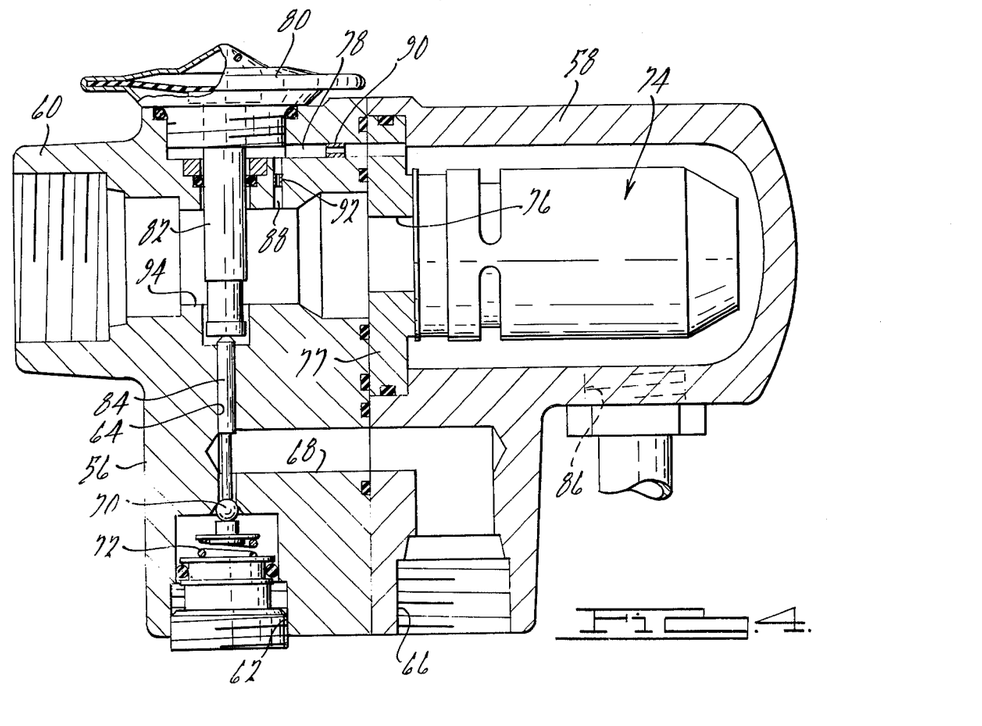
FIG. 4 shows a combined thermal expansion valve and a suction throttling valve arranged in a single assembly.

FIG. 4 shows another embodiment of a thermal expansion valve, which includes a valve body 56 bolted directly to valve body 58 for a suction throttling valve.

Body 56 is formed with a refrigerant flow inlet opening 60 which receives refrigerant from the outlet side of the evaporator. Flow outlet opening 66 and internal passage 68 also are formed in the body 56 and are connected to the inlet side of the evaporator. Opening 60 is connected to a passage which distributes a pressure signal to the thermal expansion valve from the outlet side of the evaporator. The inlet opening 62 is connected to the outlet side of the condenser through a suitable passage not shown.

The opening 66 is formed in the body 58 for the suction throttling valve. Communication between the opening 66 and the opening 62 is controlled by a flow restricting ball valve 70. Valve 70 is urged into registry with its valve seat by valve spring 72.

The suction throttling valve is indicated generally in FIG. 4 by reference character 74. It is enclosed within a registering opening in the housing 58. The interior of the suction throttling valve communicates with an inlet opening in housing end wall 77 which is connected through passage 94 to the evaporator outlet. The outlet side of the suction throttling valve communicates with passage 78, which extends to a chamber located on the lower side of the valve actuating diaphragm 80. This corresponds to the diaphragm 44 in the embodiment shown in FIG. 3.

A sealed temperature sensor bulb 82 is located between the diaphragm 80 and a valve operating rod 84 which extends through opening 64 and engages the valve 70. Upon an increase in temperature for the refrigerant entering the opening 60, the stem 84 tends to unseat the valve 70 thereby decreasing the degree of restriction to the flow of refrigerant fluid from the condenser to passage 68 which communicates, as explained earlier, with the inlet of the evaporator.

Figure 15:
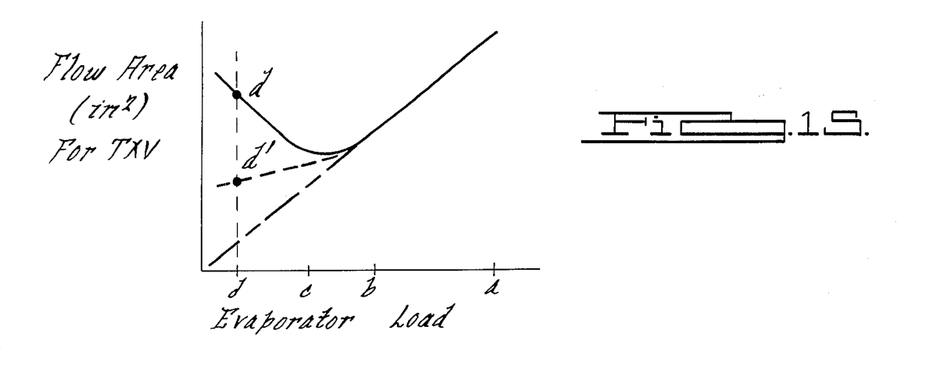
FIG. 15 shows the functional relationship between evaporator load and thermal expansion valve opening which is attributable to the operation of the suction throttling device of our invention.

The outlet from the opening in housing 58 which surrounds the suction throttling valve 74 is indicated at 86 and illustrated by means of dotted lines in FIG. 4. Passage 86 extends to the inlet side of the compressor. Passage 78, in addition to communicating with the lower side of the diaphragm 80, communicates with passage 88 formed in the housing. A calibrated flow restricting orifice 90 is located in passage 78, and a second calibrated flow restricting orifice 92 is located in passage 88. The pressure that is distributed to the chamber located below the diaphragm 80 thus is the pressure that exists between the two orifices 90 and 92. A controlled flow takes place from the central opening 94 in the housing, which communicates with the opening provided by fitting 60, through the orifices 92 and 90. The combined effect of the temperature transducer 82 and the pressure responsive diaphragm of the thermal expansion valve is a controlled throttling of the refrigerant flow to the evaporator, which will modify the relationship between the thermal expansion valve opening and the evaporator load as indicated in FIG. 15 by means of dotted lines. Excessive flooding of the evaporator with refrigerant at very low loads thus is avoided thereby counteracting the normal tendency of the thermal expansion valve to follow the curve shown in FIG. 15 by means of a full line.

If the suction throttling valve were absent, the relationship shown in FIG. 15 would follow the dot-and-dash line to a point which would cause excessive restriction of the flow. The dotted line relationship shown in FIG. 15, therefore, is a balance or an accommodation of the characteristics that would result in these two extremes. The actual shape of the dotted line curve of FIG. 15 can be controlled by appropriately calibrating the two orifices 90 and 92.

In the FIG. 3 embodiment of the thermal expansion valve a control orifice 95 is provided in a pressure signal passage 96 extending from the evaporator inlet region to the chamber 48 located below the diaphragm 44. A second calibrated orifice 97 is located in the passage 54, which extends to the outlet side of the suction throttling valve. The pressure developed in chamber 48 below the diaphragm 44 therefore is the pressure that exists between the two calibrated orifices 95 and 97 as flow passes around the evaporator outlet zone to the compressor inlet zone.

Figure 7:
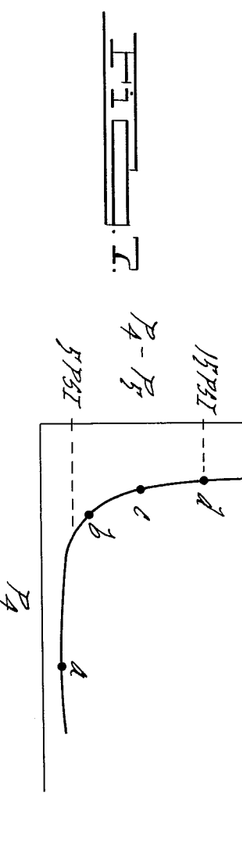
FIG. 7 shows a typical functional chart for a suction throttling valve of the kind shown in FIG. 2.

As mentioned earlier, the pressure function of the suction throttling valve is illustrated in FIG. 7. As the pressure ($P_4$) on the outlet side of the evaporator decreases to a very low value, the pressure differential ($P_4-P_5$) that exists across the suction throttling valve increases sharply. Conversely, any higher pressure levels on the evaporator outlet will be accompanied by a very small pressure differential across the suction throttling device.

A typical example of a suction throttling valve may be seen by referring to U.S. Pat. No. 3,614,966. For purposes of this description, reference may be made to FIG. 2 which shows a valve similar to the one shown at that reference patent. It includes a valve body 98 having an inlet opening 100 at one end and an outlet opening 102 at the other end. A pair of valve sleeves, one telescoped over the other, is situated in the central opening 104 formed in the valve body 98. The outer valve sleeve is designated by reference numeral 106 and the internal valve sleeve is shown at 108. Sleeve 106 has an annular valve land 109 that is urged into valving and sealing relationship with respect to an internal valve land formed in the opening 104. The valve lands are urged into sealing engagement by valve spring 110.

Figure 2:
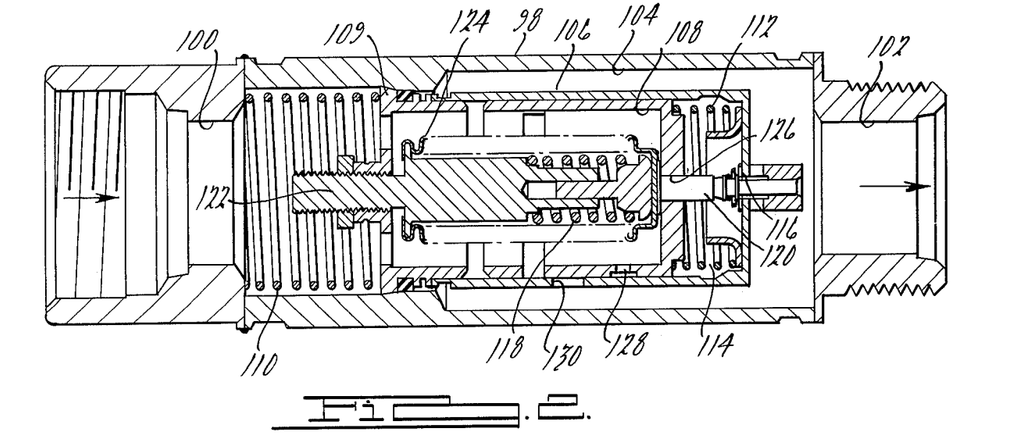
FIG. 2 shows a suction throttling valve capable of being used in the system of FIG. 1.

Another valve spring 112 is located between the end of the inner valve sleeve and the end of the outer valve sleeve. The ends of these two valve sleeves cooperate to define a pilot pressure chamber 114 which in turn communicates with the outlet opening 102 through a pilot valve 116. When the pilot valve 116 is in the position shown, communication between pilot pressure chamber 114 and the outlet opening 102 is highly restricted. Valve 116 is urged into sealing engagement by a valve spring 118 which acts on the valve stem 120 for the valve 116. Spring 118 is carried by anchor member 122 carried by annular valve land 109.

A pressure bellows 124 surrounds the spring 118. The bellows is anchored at one end to the spring anchor member 122 and at the other end it is connected to the stem 120. The exterior of the bellows is exposed to the pressure on the inlet side of the suction throttling valve. An increase in pressure at the outlet of the evaporator then will tend to shift the bellows in a left-hand direction against the opposing force of spring 118. This tends to open the valve 116 thereby relieving the pressure in chamber 114. Stem 120 may slide within a stem opening 126 formed in the end of the valve sleeve 108.

Chamber 114 is charged with pressure, which is obtained by reason of the restricted communication between port 128 and chamber 114, which is provided by the clearance between the valve sleeve. Port 128 is exposed to the inlet pressure. The main flow from the inlet 100 to the outlet 102 occurs through valve port 130 formed in the inner sleeve 106. When the outer valve sleeve moves in a right-hand direction relative to the outer valve sleeve, the port 130 is uncovered thereby increasing the direct flow from the inlet 100 to the outlet 102.

The pressure differential that is developed between the inlet 100 and the outlet 102 is plotted on the ordinate in FIG. 7. The abscissa in FIG. 7 represents pressure at the inlet 100.

Figure 10:
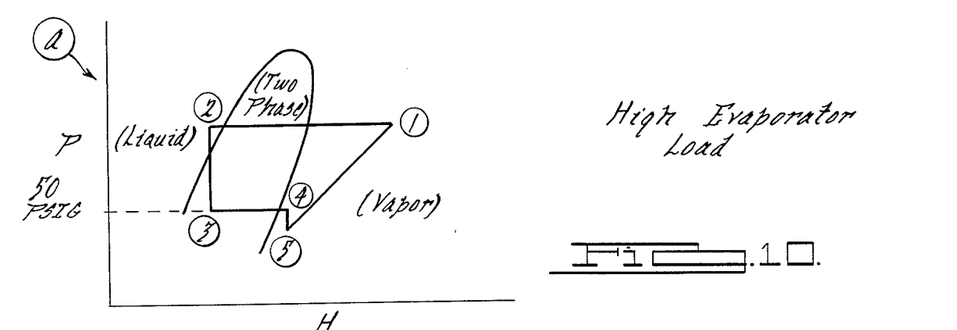
FIG. 10 shows an enthalpy diagram of an air conditioning system of the type shown in FIG. 1.

In FIG. 10 I have illustrated an enthalpy diagram superimposed on a vapor pressure curve for a refrigerant such as Freon. The points on the enthalpy diagram that define its shape are identified by the numerals 1, 2, 3, 4 and 5. These points correspond respectively to points 1, 2, 3, 4 and 5 in the air conditioner circuit shown in FIG. 1. The sloping line extending from point 5 to point 1 in FIG. 10 shows the increase in pressure due to the work imparted to the working fluid by the compressor 10. As the fluid is compressed, heat is added. It will be noted that this compression occurs in the zone of the vapor pressure curve where all of the refrigerant is in vapor form. This is true, however, only when the evaporator load is high.

From point 1 to point 2 in the enthalpy diagram of FIG. 10, the refrigerant vapor is condensed. In the case of a high evaporator load, point 2 would occur in the liquid zone. As the liquid is throttled across the thermal expansion valve, pressure is decreased to point 3. The pressure enters at the pressure of point 3 into the evaporator where heat is added. A reduction in pressure from point 4 to point 5 in the FIG. 10 diagram results from the throttling effect of the suction throttling valve.

With a high evaporator load the change in pressure from point 4 to point 5 is relatively slight. This would correspond to operating point A in FIG. 7.

Figure 11:
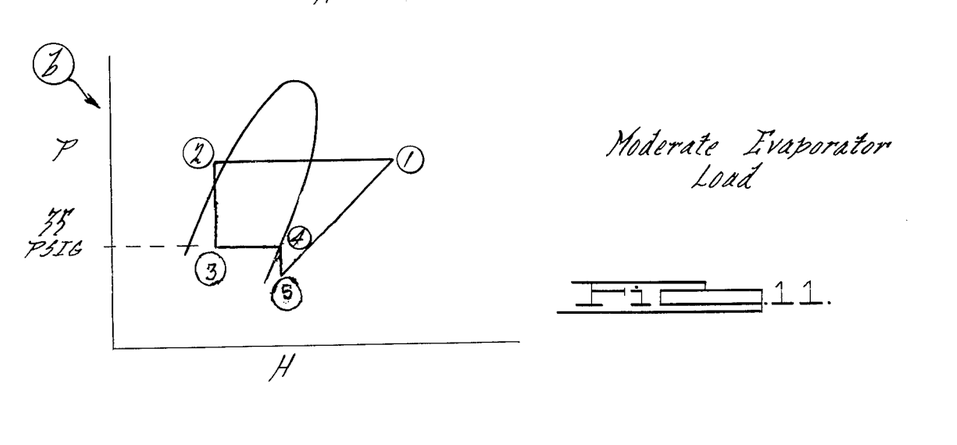
FIG. 11 shows an enthalpy diagram corresponding to the diagram of FIG. 10, although it is plotted to represent the operating characteristic of a conventional air conditioning system of the type shown in FIG. 1 when the operating load is moderate.

A corresponding diagram is shown in FIG. 11 for a moderate evaporator load. Note that the pressure differential exists across the suction throttling device is slightly increased and that the enthalpy curve relative to the vapor pressure curve is shifted slightly to the left. Still the compressor is operating entirely within the vapor zone.

Figure 12:
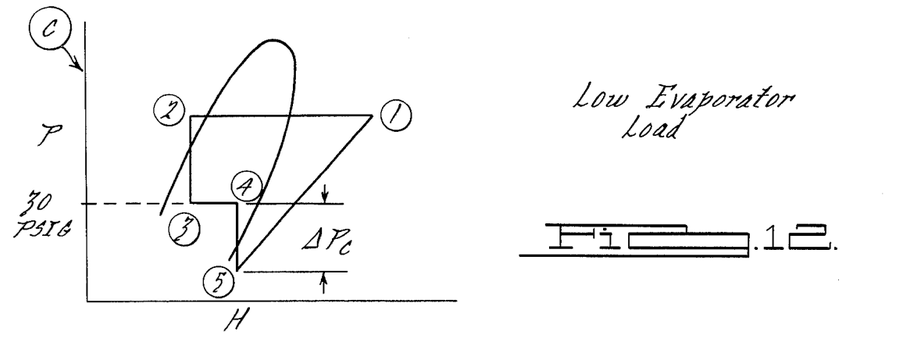
FIG. 12 is an enthalpy diagram similar to the diagrams of FIGS. 10 and 11, although it represents the conditions for a small evaporator load. The enthalpy diagrams of FIGS. 10, 11 and 12 are superimposed on a vapor pressure plot for Freon refrigerant.

In FIG. 12 I have shown the enthalpy diagram for the air conditioning system of FIG. 1 when it is operating with a low evaporator load. The refrigerant that leaves the evaporator under low load conditions is in the intermediate vapor pressure zone where a part of the refrigerant is passed across the suction throttling device, the refrigerant re-enters the vapor zone prior to entry into the compressor. The pressure drop across the suction throttling device is indicated in FIG. 12 by the symbol $\Delta P_c$. This point is illustrated in the curve of FIG. 7 by operating point C. The pressure drop across the suction throttling device in the FIG. 11 condition is illustrated in FIG. 7 by point B.

Figure 6:
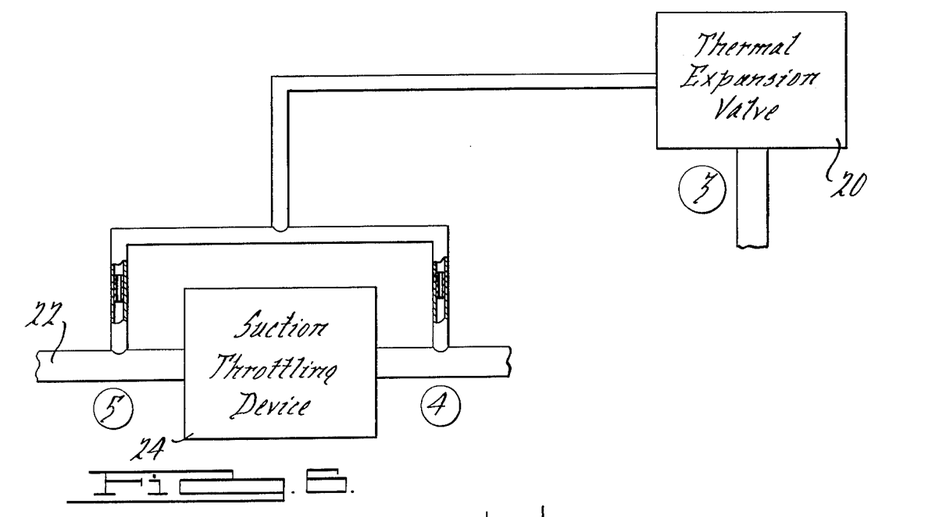
FIG. 6 shows in schematic form the disposition and function of a suction throttling device in our improved air conditioning system. The suction throttling device of FIGS. 5 and 6 may be the same as that of the embodiment shown in FIG. 2.
Figure 13:
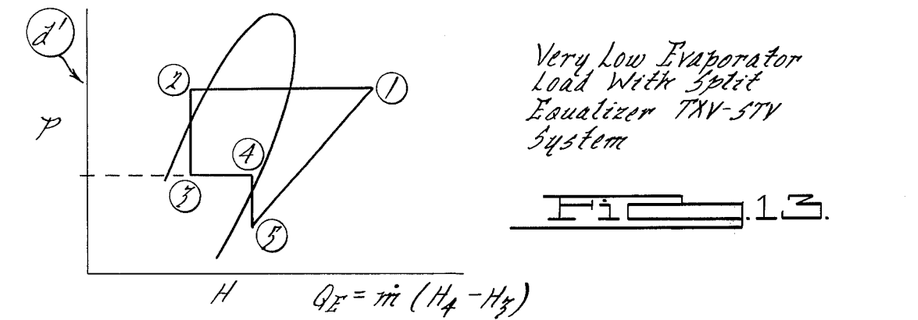
FIG. 13 shows an enthalpy diagram for very low load conditions, but it represents the operating characteristics of our improved air conditioning system with a split-equalizer expansion valve and suction throttling valve arrangement indicated schematically in FIG. 6.

FIG. 13 illustrates the condition that exists for very low evaporator loads where the throttle expansion valve and the suction throttling valve are provided with a so-called split equalizing pressure sensor. A schematic diagram of this arrangement is shown in FIG. 6. Note that the enthalpy curve has shifted relative to the vapor pressure curve substantially to the left and that the heat per pound of refrigerant added in the evaporator, which is represented by the length of the line between points 3 and 4, is increased so that the refrigerant at the outlet side of the evaporator is constituted by a relatively larger portion of the vapor than would be the case if our improved equalizer pressure sensor feature were not present. The change in pressure across the suction throttling device in FIG. 13 is sufficiently great in our improved system so that the refrigerant on the outlet side of the suction throttling device is on or very near the vapor pressure line. A larger proportion of the refrigerant entering the compressor therefore is in vapor form.

Figure 14:
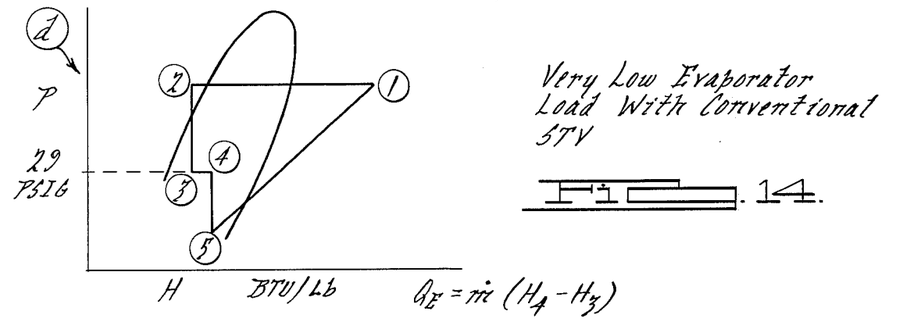
FIG. 14 shows an enthalpy diagram similar to FIG. 13 for a conventional air conditioning system having a suction throttling valve that does not employ a split equalizer pressure signal.

In order to show the contrast between the operating characteristics of my improved air conditioning cycle as illustrated in FIG. 13, we have shown in FIG. 14 the operating characteristics of an equivalent system that employs a conventional suction throttling device where the same evaporator load is present. The FIG. 14 arrangement is schematically illustrated in FIG. 5. Note that the heat absorbed by the evaporator per pound of refrigerant is relatively reduced as indicated by the abbreviated length of the line between points 3 and 4. The pressure drop across the suction throttling device, which is represented by the line extending from point 4 to point 5, is entirely within the transition or intermediate vapor pressure zone so that a relatively large percentage of the refrigerant is in liquid form as the compressor acts on the refrigerant.

The enthalpy curve in FIG. 14, as well as in the curve of FIG. 13, is shifted to the left relative to the vapor pressure curve, but the heat absorbed by the evaporator per pound of refrigerant in the FIG. 13 embodiment is very much greater than the heat absorbed in the FIG. 14 arrangement. The presence of liquid in the working fluid for the compressor, which would be present in an operating cycle such as that shown in FIG. 14, would result in a very inefficient cycle because of the necessity for a relatively large mass flow of refrigerant for any given heat flow rate for the evaporator. The heat flow for the evaporator is equal to the product of the mass rate of flow times the difference in the enthalpy value at the entrance of the heat exchanger and at the exit of the heat exchanger. Therefore, for any given heat flow a small enthalpy differential must be accompanied by a relatively large mass flow. This results in very inefficient operation, which adversely affects engine fuel economy. This condition is improved, however, in our improved system, as is apparent in FIG. 13, for any given heat flow. It is possible to provide a reduced mass flow because of the relatively large enthalpy differential across the evaporator.

Figure 8:
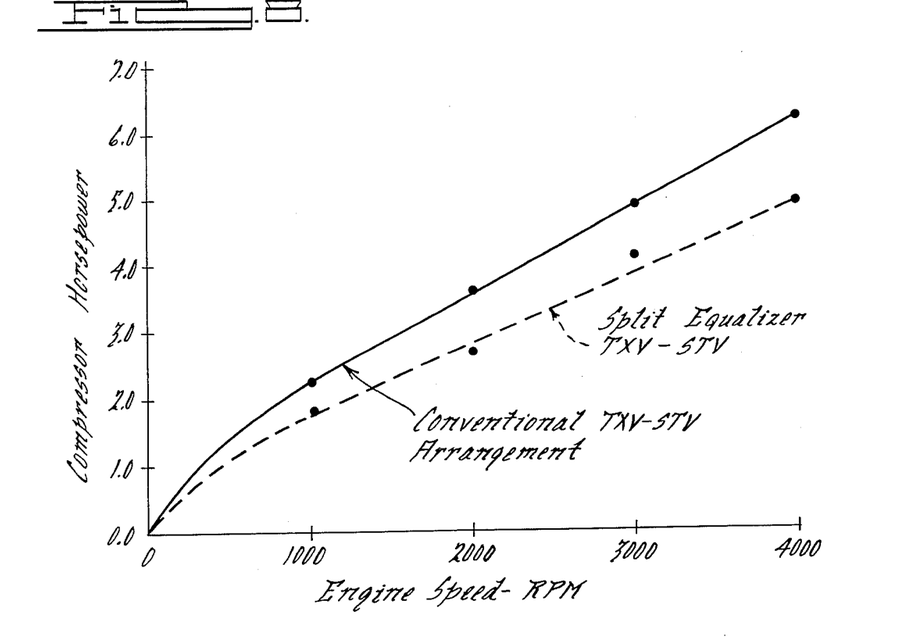
FIG. 8 shows a comparison between the compressor horsepower at typical engine speeds when the engine is equipped with a conventional air conditioning system of the type shown in FIG. 1 and the compressor horsepower for a corresponding air conditioning system embodying the improvements of our invention.
Figure 9:
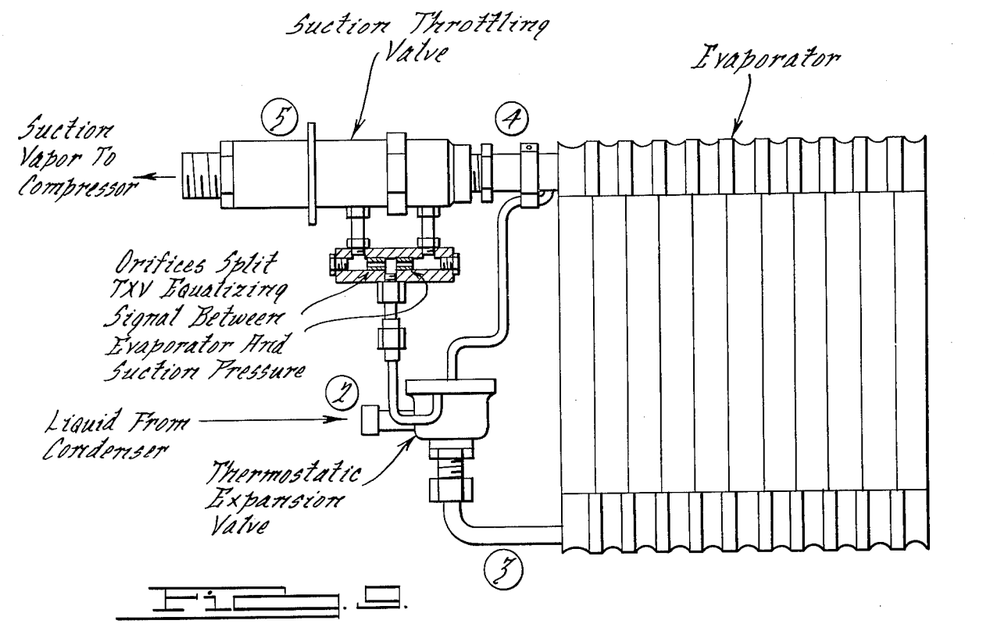
FIG. 9 is a schematic representation of an alternate embodiment of our invention which includes a modified thermostatic expansion valve and suction throttling valve arrangement.

In FIG. 8 we have shown a plot that illustrates the horsepower loss for a compressor in a conventional automotive vehicle operating in 80° ambient temperature air. The full line curve in FIG. 8 illustrates the horsepower requirements at various engine speeds for a conventional air conditioning system that does not include the improved split-equalizer, throttle-expansion valve and suction throttling valve system of our invention. The dotted line curve shows performance of the same system when the improvement of our invention is added to the system. The horsepower saving at high engine speeds and low evaporator loads is quite substantial.

Having thus described preferred embodiments of our invention, what we claim and desire to secure by U.S. Letters Patent is:

1. An air conditioning system comprising a fluid refrigerant in a closed circuit, said circuit including a compressor, a condenser and an evaporator located in series relationship, a thermal expansion valve in the circuit between the condenser outlet and the evaporator inlet, a suction throttling device located between the evaporator outlet and the compressor inlet, said thermal expansion valve comprising a variable flow restriction and a valve means for controlling the degree of restriction to refrigerant flow, said suction throttling device including a refrigerant flow restriction and valve means for controlling the flow through said restriction whereby the pressure differential across the suction throttling device for any given pressure on the outlet side of the evaporator is greater at low evaporator outlet pressures than at high evaporator outlet pressure, a controlled bypass flow passage from a point downstream of the thermal expansion valve to a point downstream of the suction throttling device including flow restricting means therein for determining the effective signal pressure in said bypass passage, said thermal expansion valve means including means responding to the temperature at the outlet of the evaporator and including means responding to the signal pressure in said bypass passage to vary the degree of flow restriction for the refrigerant entering the evaporator.

2. An air conditioning system comprising a fluid refrigerant in a closed circuit, said circuit including a compressor, a condenser and an evaporator located in series relationship, a thermal expansion valve in the circuit between the condenser outlet and the evaporator inlet, a suction throttling device located between the evaporator outlet and the compressor inlet, said thermal expansion valve comprisng a variable flow restriction and a valve means for controlling the degree of restriction of refrigerant flow, said suction throttling device including a refrigerant flow restriction and valve means for controlling the flow through said restriction whereby the pressure differential across the suction throttling device for any given pressure on the outlet side of the evaporator is greater at low evaporator outlet pressures than at higher evaporator outlet pressures, a controlled bypass flow passage around the evaporator and the suction throttling device including flow restricting means therein for determining the effective signal pressure in said bypass passage, said thermal expansion valve means including means responding to the temperature at the outlet of the evaporator and including means responding to the signal pressure in said bypass passage to vary the degree of flow restriction for the refrigerant entering the evaporator.

3. An air conditioning system having fluid refrigerant in a closed circuit, said circuit including a compressor, a condenser and an evaporator located in fluid-flow series relationship, a thermal expansion valve located in said circuit between the outlet of the condenser and the inlet of the evaporator, said thermal expansion valve including a variable flow restricting valve, a suction throttling device between the evaporator outlet and the compressor inlet for establishing a pressure drop in the refrigerant flow path that is higher at low evaporator outlet pressures than at higher evaporator outlet pressures, a bypass flow passage around the suction throttling device, means for controlling the rate of flow of refrigerant through said bypass passage, and control means responsive to the pressure at the bypass passage and to the temperature of said evaporator to control the degree of restriction of said thermal expansion valve to the flow of refrigerant therethrough.

4. The combination set forth in claim 1 wherein said bypass passage has a pair of calibrated flow-restrictions therein for establishing a pilot pressure zone between the orifices upon flow of fluid from the inlet side of the suction throttling device to the outlet side thereof through said bypass passage, said pilot pressure zone being in fluid communication with said thermal expansion valve.

5. The combination set forth in claim 2 wherein said bypass passage has a pair of calibrated flow-restrictions therein for establishing a pilot pressure zone between the orifices upon flow of fluid from the inlet side of the suction throttling device to the outlet side thereof through said bypass passage, said pilot pressure zone being in fluid communication with said thermal expansion valve.

6. The combination set forth in claim 3 wherein said bypass passage has a pair of calibrated flow-restrictions therein for establishing a pilot pressure zone between the orifices upon flow of fluid from the inlet side of the suction throttling device to the outlet side thereof through said bypass passage, said pilot pressure zone being in fluid communication with said thermal expansion valve.

* * * * *